United States Patent
Jang et al.

(10) Patent No.: US 9,225,235 B2
(45) Date of Patent: Dec. 29, 2015

(54) POWER FACTOR CORRECTION CIRCUIT

(71) Applicants: SAMSUNG ELECTRO-MECHANICS CO., LTD., Suwon, Gyunggi-do (KR); University of Seoul Industry Cooperation Foundation, Seoul (KR)

(72) Inventors: Yu Jin Jang, Gyunggi-do (KR); Hwan Cho, Gyunggi-do (KR); Yong Seong Roh, Incheon (KR); Young Jin Moon, Gwangju (KR); Jeong Pyo Park, Gyeonggi-do (KR); Chang Sik Yoo, Seoul (KR); Jeong Mo Yang, Gyunggi-do (KR); Joong Ho Choi, Gyeonggi-do (KR)

(73) Assignees: SAMSUNG ELECTRO-MECHANICS CO., LTD., Suwon-Si, Gyeonggi-Do (KR); UNIVERSITY OF SEOUL INDUSTRY COOPERATION FOUNDATION, Seoul (KR)

( * ) Notice: Subject to any disclaimer, the term of this patent is extended or adjusted under 35 U.S.C. 154(b) by 280 days.

(21) Appl. No.: 13/892,013

(22) Filed: May 10, 2013

(65) Prior Publication Data
US 2014/0185339 A1    Jul. 3, 2014

(30) Foreign Application Priority Data
Dec. 28, 2012    (KR) .................. 10-2012-0157073

(51) Int. Cl.
H02M 1/36    (2007.01)
H02M 1/42    (2007.01)
H02M 1/00    (2007.01)

(52) U.S. Cl.
CPC .............. *H02M 1/36* (2013.01); *H02M 1/4225* (2013.01); *H02M 2001/0022* (2013.01); *Y02B 70/126* (2013.01)

(58) Field of Classification Search
CPC . H02M 2001/0022; H02M 1/36; H02M 1/42; H02M 1/4225
See application file for complete search history.

(56) References Cited

U.S. PATENT DOCUMENTS

| 4,806,842 | A * | 2/1989 | Bittner .......................... 323/222 |
| 5,264,782 | A * | 11/1993 | Newton ........................ 323/288 |
| 7,019,507 | B1 * | 3/2006 | Dittmer et al. ................ 323/284 |
| 7,501,805 | B2 * | 3/2009 | Chen et al. .................... 323/282 |
| 7,635,968 | B2 * | 12/2009 | McDonald et al. ........... 323/222 |
| 8,198,873 | B2 | 6/2012 | Young |
| 2007/0035281 | A1 * | 2/2007 | Kuroiwa et al. .............. 323/222 |

(Continued)

FOREIGN PATENT DOCUMENTS

KR    10-0439848 B1    7/2004
KR    2009-0041216 A    4/2009

*Primary Examiner* — Fred E Finch, III
(74) *Attorney, Agent, or Firm* — McDermott Will & Emery LLP

(57) ABSTRACT

There is provided a power factor correction circuit including: a power conversion circuit unit controlling an inductor current according to a switching signal applied to a main switch to convert an external input voltage into an output voltage having a predetermined range; an imbalance detection circuit outputting an imbalance state signal when the external input voltage is in an unbalanced state by using the inductor current; and a soft start circuit unit performing soft starting by adjusting the switching signal when the imbalance state signal is output by the imbalance detection circuit unit.

11 Claims, 4 Drawing Sheets

(56) References Cited

U.S. PATENT DOCUMENTS

| | | | |
|---|---|---|---|
| 2009/0284237 A1* | 11/2009 | Kitagawa et al. | 323/282 |
| 2010/0039836 A1* | 2/2010 | Gong et al. | 363/21.13 |
| 2011/0006748 A1* | 1/2011 | Jang et al. | 323/299 |
| 2013/0280100 A1* | 10/2013 | Zumstein et al. | 417/44.1 |

\* cited by examiner

POWER FACTOR CORRECTION CIRCUIT

CROSS-REFERENCE TO RELATED APPLICATIONS

This application claims the priority of Korean Patent Application No. 10-2012-0157073 filed on Dec. 28, 2012, in the Korean Intellectual Property Office, the disclosure of which is incorporated herein by reference.

BACKGROUND OF THE INVENTION

1. Field of the Invention

The present invention relates to a technique of improving a power factor and, more particularly, to a power factor correction circuit capable of stably correcting an external input voltage although the external input voltage is unstably input.

2. Description of the Related Art

Recently, as the use of electrical energy has increased, due to the increasing use of electronic devices, stable supplies of power have been at issue. Nations around the world have tightened regulations regarding harmonic components generated from input terminals of electronic devices in order to minimize an influence of electronic devices on power lines and minimize interference in a different device.

In order to meet governmental regulations, various techniques have been provided for power factor correction circuits.

A power factor correction circuit may be classified as a passive power factor correction circuit including an inductor and a capacitor and an active power factor correction circuit using a switching converter. The passive power factor circuit has a large form factor and a low power factor, and is, consequently, limitedly used, while the active power factor correction circuit is widely used.

A power factor correction circuit employed in a related art power conversion module commonly uses a boundary conduction mode (BCM) based on zero voltage switching due to ease of implementation.

However, in the case of the BCM, when a low current is required for an input or when an input voltage is low, a switching frequency is increased to increase a switching loss, reducing efficiency.

In an effort to solve the problem, power factor correction circuits supporting various modes have been developed. For example, a power factor correction circuit using both a discontinuous conduction mode (DCM) and a continuous conduction mode (CCM), or the like, has been provided. Namely, when external input power is maintained, the CCM is used, and when an external input voltage is low, the DCM mode is used.

In this case, however, when an external input voltage is recovered, a returning operation is performed at a point at which a control level is high, increasing an output voltage to an over voltage protection (OVP) point at a stabilization time, so a protection mode is operational, and thus, a current is cut off.

Also, when a section in which a current is cut off is increased, an output current is unstable to cause a problem with a load control. In addition, a secondary problem such as noise generation, or the like, arises.

Related art documents below do not provide a solution to the foregoing problem.

Related Art Document (Patent document 1) Korean Patent Registration No. 10-0439848

(Patent document 2) Korean Patent Laid Open Publication No. 2009-0041216

SUMMARY OF THE INVENTION

An aspect of the present invention provides a power factor correction circuit in which, when an imbalance is detected in an external input voltage, a soft start is applied to prevent a current cutoff and allow an output voltage to be operated within an over-voltage protection.

According to an aspect of the present invention, there is provided a power factor correction circuit. The power factor correction circuit includes: a power conversion circuit unit controlling an inductor current according to a switching signal applied to a main switch to convert an external input voltage into an output voltage having a predetermined range; an imbalance detection circuit outputting an imbalance state signal when the external input voltage is in an unbalanced state by using the inductor current; and a soft start circuit unit performing soft starting by adjusting the switching signal when the imbalance state signal is output by the imbalance detection circuit unit.

When a level of the inductor current is equal to or lower than a pre-set level and an ON time of the switching signal is equal to or longer than a pre-set duration, the imbalance detection circuit unit may determine that the external input voltage is in the unbalanced state.

The imbalance detection circuit unit may include: a first comparator comparing a first reference voltage calculated by using the inductor current with a pre-set first reference voltage; a second comparator comparing the ON time of the switching signal with a pre-set reference duration; and a counter outputting the imbalance state signal when an output from the first comparator and an output from the second comparator have a high value during a pre-set period of time.

The power conversion circuit unit may include: a rectifying unit rectifying the external input voltage; an inductor having one end connected to the rectifying unit and the other end connected to a diode; a main switch having one end connected to the inductor and the diode, and connected to the rectifying unit in parallel; and a first resistor connected to the main switch and the rectifying unit in series.

The first reference voltage may be calculated by using a value obtained by multiplying a value of the first resistor and the inductor current.

The soft start circuit unit may include: a comparison voltage generation unit comparing the output voltage with a pre-set reference voltage and outputting a comparison voltage; and a switching signal generation unit comparing the comparison voltage with a predetermined triangular wave and providing the switching signal of the main switch.

The soft start circuit unit may further include: a soft start unit connected to an output terminal of the comparator and resetting the comparison voltage according to the imbalance state signal.

When the imbalance state signal is input, the soft start unit may reset the comparison voltage to 0.

The soft start unit may include: a capacitor connected to an output terminal of the comparator in parallel; and a switch connected to the capacitor in parallel and performing an earthing operation according to the imbalance state signal.

The comparison voltage generation unit may include: a voltage dividing unit dividing the output voltage according to a pre-set ratio; and a comparator comparing the output voltage divided by the voltage dividing unit with the pre-set reference voltage and outputting a comparison voltage.

The switching signal generation unit may include a comparator receiving the comparison voltage when the external input voltage is not in an unbalance state, and receiving the predetermined reference signal when the external input voltage is in an unbalanced state, comparing the same with the triangular wave, and providing the switching signal.

The switching signal generation unit may include: a first switch performing an ON switching operation to input the comparison voltage to the comparator when the imbalance state signal has a low value; and a second switch performing an ON switching operation to input the predetermined reference signal to the comparator when the imbalance state signal has a high value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
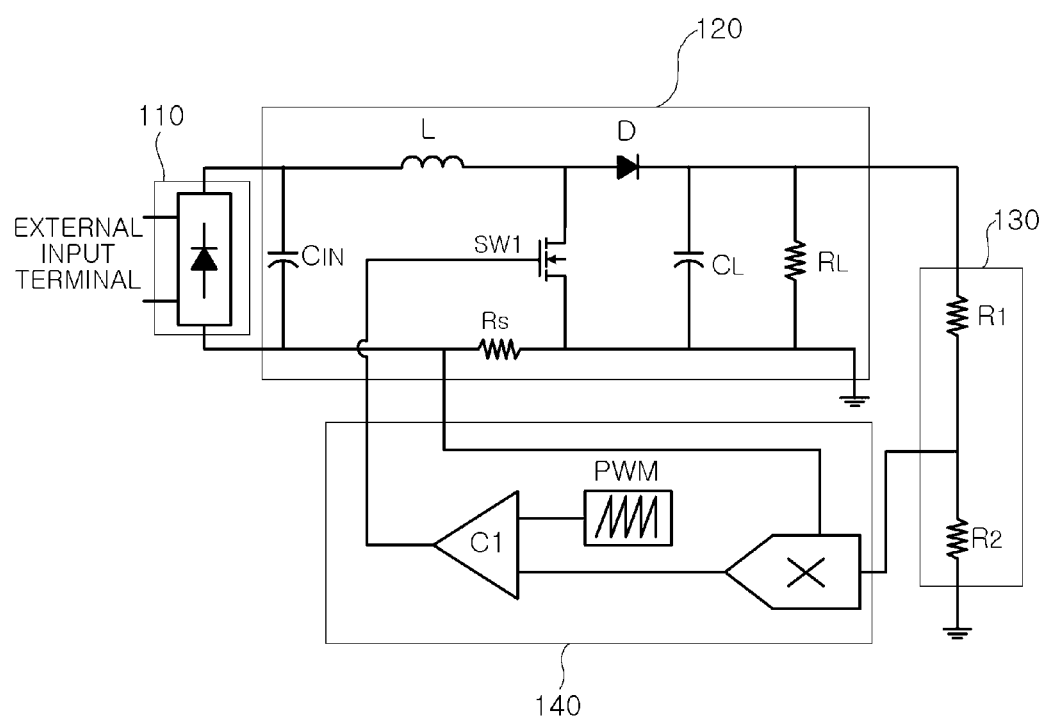
FIG. 1 is a schematic circuit diagram of a general power factor correction circuit.

Embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Meanwhile, terminology used herein may be understood as follows.

Terms such as "first" and "second," etc., may be used to describe various components, and such components must not be understood as being limited to the above terms. The above terms are used only to distinguish one component from another. For example, a first component may be referred to as a second component without departing from the scope of rights of the present invention, and likewise a second component may be referred to as a first component.

In the drawings, the shapes and dimensions of elements may be exaggerated for clarity, and the same reference numerals will be used throughout to designate the same or like components.

FIG. 1 is a schematic circuit diagram of a general power factor correction circuit.

The general power factor correction circuit illustrated in FIG. 1 mixedly uses a discontinuous conduction mode (DCM) and a continuous conduction mode (CCM).

Referring to FIG. 1, the power factor correction circuit includes a rectifying unit 110, a power conversion unit 120, a voltage dividing unit 130, and an imbalance controller 140.

The rectifying unit 110 may rectify an external input voltage and output the same. Hereinafter, an external input voltage output from the rectifying unit 110 will be referred to as an 'input voltage'.

The power conversion unit 120 may control an inductor current according to a switching signal applied to a main switch SW1 to thereby convert the input voltage into an output voltage having a predetermined magnitude and output the same.

In detail, the power conversion unit 120 may include an inductor L, the main switch SW1, a diode D, a rectifying capacitor $C_L$, and a load $R_L$.

The inductor L may have one end connected to the rectifying unit 110 and the other end connected to the main switch SW1.

The main switch SW1, having a drain connected to the other end of the inductor L and a source connected to the rectifying unit 110, receives a switching signal in a gate terminal thereof to control a current flowing to the inductor L.

The diode D has an anode connected to the drain of the main switch SW1 and a cathode connected to the rectifying capacitor $C_L$. The rectifying capacitor $C_L$ may be connected to the cathode of the diode D.

The load $R_L$ may be connected to both ends of the rectifying capacitor $C_L$.

In an embodiment, the power conversion unit 120 may further include a smoothing capacitor $C_{IN}$.

According to an embodiment of the present invention, the power conversion unit 120 is illustrated as a boost type converter, but the present invention is not necessarily limited thereto and various power conversion modules such as a buck converter, a buck boost converter, and the like, may be employed.

A current loop of the power conversion unit 120 may allow an average value of an inductor current to operate in the form of a sine wave like an AC input voltage.

The voltage dividing unit 130 may divide an output voltage input from the power conversion unit 120, according to a predetermined ratio.

The imbalance controller 140 may control an inductor current by using pulse width modulation (PWM) such that the inductor current corresponds to the external input voltage through the current loop.

The imbalance controller 140 may control an average input current detected from the inductor current to operate according to the input voltage of the device by using the continuous conduction mode (CCM).

Meanwhile, in a condition in which the external input voltage is high or low, the imbalance controller 140 may operate in the discontinuous conduction mode (DCM).

Figure 2:
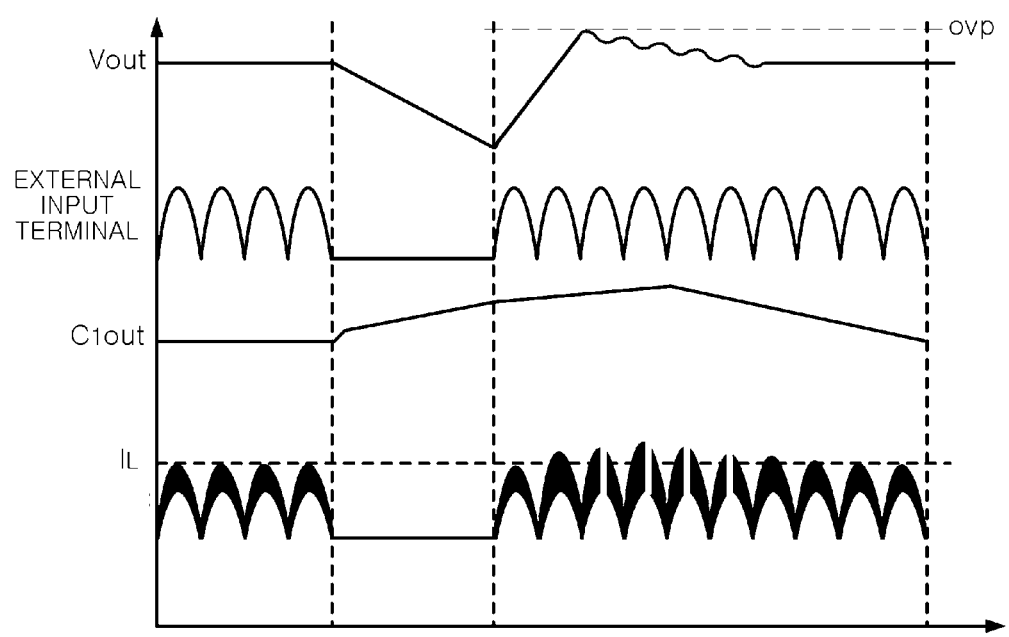
FIG. 2 is a graph showing various input and output signals generated in the power factor correction circuit of FIG. 1.

FIG. 2 is a graph showing various input and output signals generated in the power factor correction circuit of FIG. 1. Hereinafter, changes in various input and output signals according to an operation of the power factor correction circuit of FIG. 1 will be described.

Referring to FIGS. 1 and 2, in the power factor correction circuit, when a delay time (or a holdup time) is applied to the external input power, an output Vout is continuously lowered. Thus, An output Clout of a comparator is rapidly increased.

When the external input power is returned to a normal state, the power factor correction circuit resumes an operation at a point at which a control level is high, and thus, an output Vout of the power factor correction circuit is rapidly increased up to an over voltage protection (OVP) level before a stabilization time arrives.

Thus, a protection circuit operates, and thus, the inductor current $I_L$ is temporarily cut off. Although the stabilization operation, with the inductor current IL cut off, is performed, due to the section in which the inductor current $I_L$ is cut off, a current supply to an output of the device is unstable, causing a problem of an output side load control and generating noise.

Hereinafter, a power factor correction circuit according to an embodiment of the present invention will be described with reference to FIGS. 3 and 4.

Here, however, content, which is the same as or equivalent to that described above with reference to FIGS. 1 and 2 will not be described to avoid redundancy, but a person skilled in the art may easily understand the power factor correction circuit according to an embodiment of the present invention described hereinafter based on the foregoing description.

Figure 3:
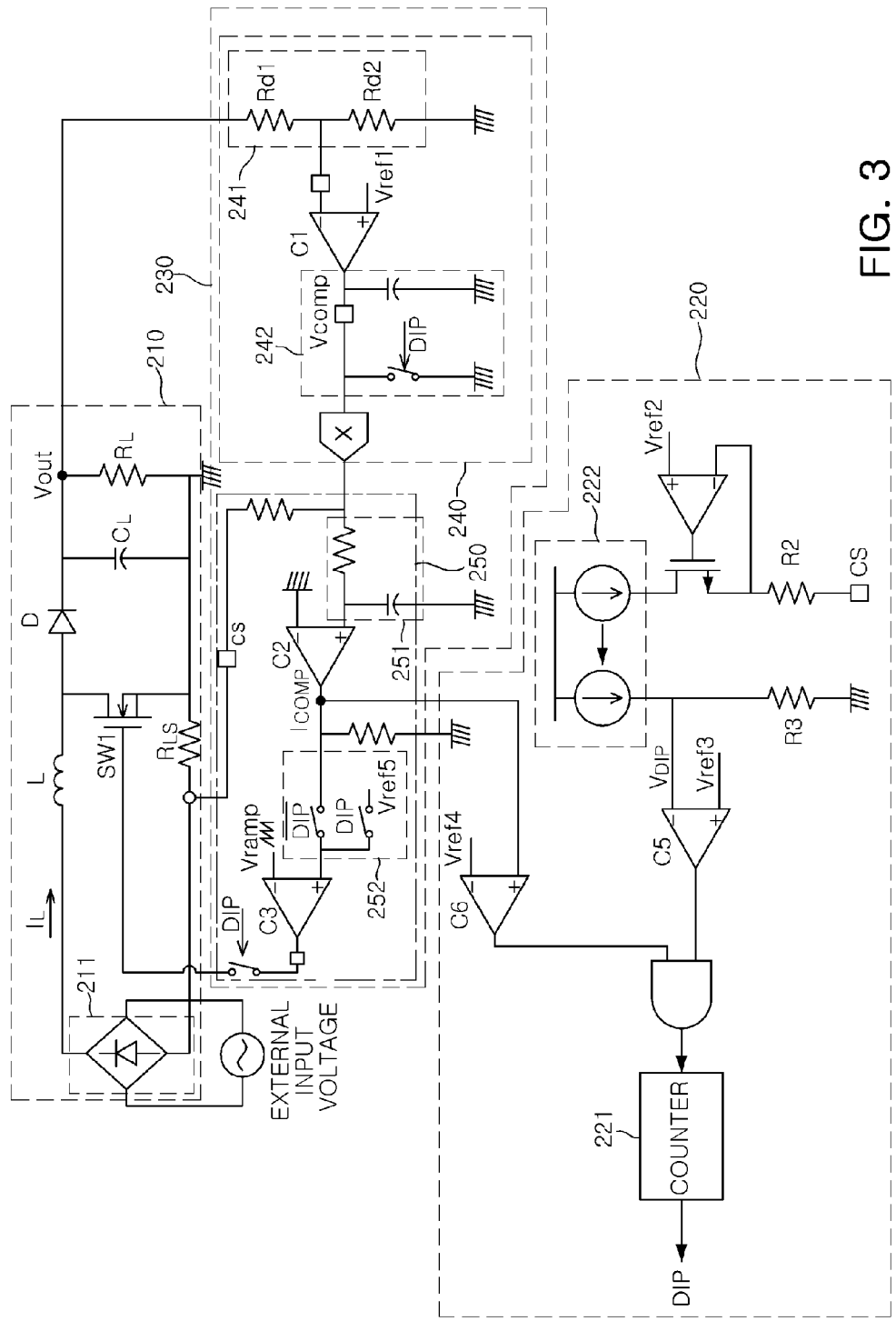
FIG. 3 is a schematic circuit diagram of a power factor correction circuit according to an embodiment of the present invention.
Figure 4:
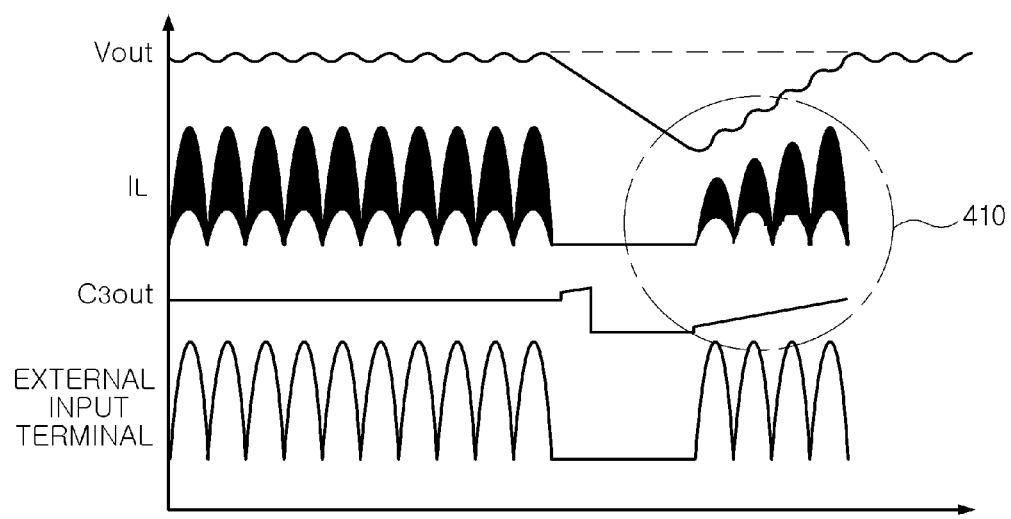
FIG. 4 is a graph showing various input and output signals generated in the power factor correction circuit of FIG. 3.

FIG. 3 is a schematic circuit diagram of a power factor correction circuit according to an embodiment of the present invention.

Referring to FIG. 3, the power factor correction circuit may include a power conversion circuit unit 210, an imbalance detection circuit unit 220, and a soft start circuit unit 230.

The power conversion circuit unit 210 may control an inductor current $I_L$ according to a switching signal applied to a main switch SW1 to convert an external input voltage into an output voltage Vout having a predetermined range.

In detail, the power conversion circuit unit 210 may include a rectifying unit 211, an inductor L, the main switch SW1, a diode D, a rectifying capacitor $C_L$, and a load $R_L$.

The rectifying unit 211 may rectify an external input voltage and output the same.

The inductor L may have one end connected to the rectifying unit 110 and the other end connected to the main switch SW1 and the diode D.

The main switch SW1 may have one end connected to the inductor L and the diode D and connected to the rectifying unit 211 in parallel. In detail, a drain of the main switch SW1 may be connected to the other end of the inductor L, a source thereof may be connected to the rectifying unit 101, and a gate terminal thereof receives the switching signal to control a current flowing to the inductor L.

The diode D may have an anode connected to the drain of the main switch SW1, a cathode connected to the rectifying capacitor $C_L$. The rectifying capacitor $C_L$ may be connected to the cathode of the diode D.

The load $R_L$ may be connected to both ends of the rectifying capacitor $C_L$.

A sensing resistor $R_{LS}$ may be connected in series to the main switch SW1 and the rectifying unit 211.

When the external input voltage is in an unbalanced state, the imbalance detection circuit unit 220 may output an imbalance state signal by using the inductor current $I_L$.

When the inductor current $I_L$ has a level equal to or lower than a pre-set level and an ON time of the switching signal is equal to or longer than a pre-set duration, the imbalance detection circuit unit 220 may determine that the external input voltage is in an unbalanced state. Namely, the imbalance detection circuit unit 220 may detect the unbalanced state in consideration of the ON time of the main switch together as well as the inductor current $I_L$. This is because, when the ON time of the main switch SW1 is less than the pre-set time, although the operation is performed in manner as described above, the output voltage Vout does not reach an overvoltage state, i.e., the OVP, so the foregoing inductor current $I_L$ is not cut off.

In an embodiment, the imbalance detection circuit unit 220 may include a first comparator C5, a second comparator C6, and a counter 221. The first comparator C5 may compare a reference voltage $V_{DIP}$ calculated by using the inductor current IL with a pre-set reference voltage. The second comparator C6 may compare the ON time of the switching signal with the pre-set reference duration. The counter 221 may output an imbalance state signal DIP when both an output from the first comparator C5 and an output from the second comparator C6 have a high level.

Here, the reference voltage $V_{DIP}$ may be calculated by using a value obtained by multiplying resistance Rs and the inductor current $I_L$. In detail, a voltage of a terminal CS may be expressed by Equation 1 shown below.

$$Vcs = -I_L * Rcs \quad \text{[Equation 1]}$$

Thus, a voltage transferred by a mirror unit 222 may be expressed by Equation 2 shown below.

$$V = -(I_L * Rcs)/R_2 \quad \text{[Equation 2]}$$

Also, the voltage $V_{DIP}$ input to an inverting terminal of the first comparator C5 may be expressed by Equation 3 shown below.

$$V_{DIP} = (I_L * Rcs)(R_3/R_2) \quad \text{[Equation 3]}$$

Here, $V_{ref3}$ input to a non-inverting terminal of the first comparator C5 is an abnormal state threshold value of the inductor current $I_L$. Thus, when the voltage $V_{DIP}$ lower than the abnormal state threshold value is input, since it means that the value of the inductor current $I_L$ is small, namely, the external input voltage comes as being small in an abnormal state, so the first comparator C5 outputs a high value.

The second comparator C6 may compare an output (comparison current Icomp) from the comparator C2 with a pre-set reference signal $V_{ref4}$, and when the comparison current Icomp is smaller, since it means that the ON time of the switching signal is greater than a pre-set value, the second comparator C6 may output a high value.

As a result, when a small external input voltage in an abnormal state comes in, the first comparator C5 may output a high value, and when the ON time of the switching signal of the main switch SW1 continues for longer than a predetermined time, the second comparator C6 may output a high value. Thus, when both the first comparator C5 and the second comparator C6 have high values, a value is input to the counter 221.

Here, when the input high value continues for longer than a predetermined time, the counter 221 may output a state abnormality signal DIP.

When the imbalance state signal is output by the imbalance detection circuit unit 220, the soft start circuit unit 230 may perform soft starting by adjusting a switching signal.

The soft start circuit unit 230 may include a comparison voltage generation unit 240 and a switching signal generation unit 250.

The comparison voltage generation unit 240 may compare an output voltage Vout with a pre-set reference voltage $V_{ref1}$ and output a comparison voltage Vcomp.

In an embodiment, the comparison voltage generation unit 240 may include a voltage dividing unit 241 dividing the output voltage Vout according to a pre-set ratio, and a comparator C1 comparing the output voltage Vout divided by the voltage dividing unit 241 with the pre-set reference voltage $V_{ref1}$ and outputting a comparison voltage.

The voltage dividing unit 241 may change the ratio of the output voltage Vout according to a ratio between resistors Rd1 and Rd2.

The comparison voltage generation unit 240 may further include a soft start unit 242.

The soft start unit 242 may be connected to an output terminal of the comparator C1 and reset the comparison voltage Vcomp according to the imbalance state signal DIP. For example, when the imbalance state signal DIP has a high value, the soft start unit 242 may reset the comparison voltage Vcomp to 0.

In an embodiment, the soft start unit 242 may include a capacitor connected in parallel to an output terminal of the comparator C1 and a switch performing an earthing operation according to an imbalance state signal.

Namely, when the imbalance state signal has a high value, the switch is turned on and the comparison voltage Vcomp is 0. Thereafter, when the imbalance state signal is changed into a low value, the comparison voltage Vcomp is gradually increased by the capacitor. Thus, in this manner, soft starting may be performed by the soft start unit 242.

The switching signal generation unit 250 may compare the comparison voltage Vcomp with a predetermined triangular wave Vramp, and provide a switching signal of the main switch SW1.

In detail, the second comparator C2 included in the switching signal generation unit 250 may receive the comparison voltage Vcomp filtered by a filter 251, by a non-inverting terminal thereof, and compare the comparison voltage Vcomp with a ground 0, and output the comparison signal Icomp.

Also, a third comparator C3 may receive the comparison voltage Vcomp, and when the comparison voltage Vcomp is in an unbalanced state, the third comparator C3 receives a predetermined reference signal Vref5, compares it with a predetermined triangular wave Vramp, and provides a switching signal. Here, the comparison voltage is a value associated with the comparison current Icomp, so the third comparator C3 may receive the comparison current Icomp replacing the comparison voltage Vcomp, and perform the same operation.

In detail, the third comparator C3 may receive the predetermined triangular wave Vramp by an inverting terminal thereof, and receive the comparison current Icomp or the predetermined reference signal Vref5 by the non-inverting terminal thereof according to an unbalanced state.

In detail, in case of not being in an unbalanced state (i.e., when the external input voltage is not in an unbalanced state), a first switch (an upper switch) connecting the comparison current Icomp in a switching unit 252 is turned on. Meanwhile, in case of being in an unbalanced state, the DIP signal is input, so a second switch (a lower switch) connecting the predetermined reference signal Vref5 is turned on to allow the reference signal Vref5 to be input to the non-inverting terminal of the comparator C3.

Here, the switching unit 252 may include the first switch (the upper switch) performing an ON switching operation to allow the comparison voltage Vcomp to be input to the comparator C3 when the imbalance state signal DIP has a low value, and the second switch (the lower switch) performing an ON switching operation to allow the predetermined reference signal Vref5 to be input to the comparator C3 when the imbalance state signal DIP has a high value.

As set forth above, according to embodiments of the invention, when an imbalance of an external input voltage is detected, soft starting is applied to prevent a current cutoff and allow an output voltage to be operated within a protection reference.

While the present invention has been shown and described in connection with the embodiments, it will be apparent to those skilled in the art that modifications and variations can be made without departing from the spirit and scope of the invention as defined by the appended claims.

What is claimed is:

1. A power factor correction circuit comprising:
   a power conversion circuit unit controlling an inductor current according to a switching signal applied to a main switch to convert an external input voltage into an output voltage having a predetermined range;
   an imbalance detection circuit outputting an imbalance state signal when the external input voltage is in an unbalanced state by using the inductor current,
   wherein when a level of the inductor current is equal to or lower than a pre-set level and an ON time of the switching signal is equal to or longer than a pre-set duration, the imbalance detection circuit unit determines that the external input voltage is in the unbalanced state; and
   a soft start circuit unit performing soft starting by adjusting the switching signal when the imbalance state signal is output by the imbalance detection circuit unit.

2. The power factor correction circuit of claim 1, wherein the imbalance detection circuit unit comprises:
   a first comparator comparing a first reference voltage calculated by using the inductor current with a pre-set first reference voltage;
   a second comparator comparing the ON time of the switching signal with a pre-set reference duration; and
   a counter outputting the imbalance state signal when an output from the first comparator and an output from the second comparator have a high value during a pre-set period of time.

3. The power factor correction circuit of claim 1, wherein the power conversion circuit unit comprises:
   a rectifying unit rectifying the external input voltage;
   an inductor having one end connected to the rectifying unit and the other end connected to a diode;
   a main switch having one end connected to the inductor and the diode, and connected to the rectifying unit in parallel; and
   a first resistor connected to the main switch and the rectifying unit in series.

4. The power factor correction circuit of claim 3, wherein the first reference voltage is calculated by using a value obtained by multiplying a value of the first resistor and the inductor current.

5. The power factor correction circuit of claim 1, wherein the soft start circuit unit comprises:
   a comparison voltage generation unit comparing the output voltage with a pre-set reference voltage and outputting a comparison voltage; and
   a switching signal generation unit comparing the comparison voltage with a predetermined triangular wave and providing the switching signal of the main switch.

6. The power factor correction circuit of claim 5, wherein the comparison voltage generation unit comprises:
   a voltage dividing unit dividing the output voltage according to a pre-set ratio; and
   a comparator comparing the output voltage divided by the voltage dividing unit with the pre-set reference voltage and outputting the comparison voltage.

7. The power factor correction circuit of claim 6, wherein the soft start circuit unit further comprises: a soft start unit connected to an output terminal of the comparator and resetting the comparison voltage according to the imbalance state signal.

8. The power factor correction circuit of claim 7, wherein when the imbalance state signal is input, the soft start unit resets the comparison voltage to 0.

9. The power factor correction circuit of claim 7, wherein the soft start unit comprises:
   a capacitor connected to an output terminal of the comparator in parallel; and a switch connected to the capacitor in parallel and performing an earthing operation according to the imbalance state signal.

10. The power factor correction circuit of claim 5, wherein the switching signal generation unit comprises a comparator receiving the comparison voltage when the external input voltage is not in an unbalance state, and receiving the predetermined reference signal when the external input voltage is in an unbalanced state, comparing the same with the triangular wave, and providing the switching signal.

11. The power factor correction circuit of claim 10, wherein the switching signal generation unit further comprises:
   a first switch performing an ON switching operation to input the comparison voltage to the comparator when the imbalance state signal has a low value; and
   a second switch performing an ON switching operation to input the predetermined reference signal to the comparator when the imbalance state signal has a high value.

* * * * *